Oct. 2, 1928.

V. ROYLE 1,686,256

APPARATUS FOR DISTRIBUTING POWDERED MATERIAL

Filed May 26, 1923    2 Sheets-Sheet 1

INVENTOR
Vernon Royle
BY
his ATTORNEYS

Oct. 2, 1928.
V. ROYLE
1,686,256
APPARATUS FOR DISTRIBUTING POWDERED MATERIAL
Filed May 26, 1923   2 Sheets-Sheet 2
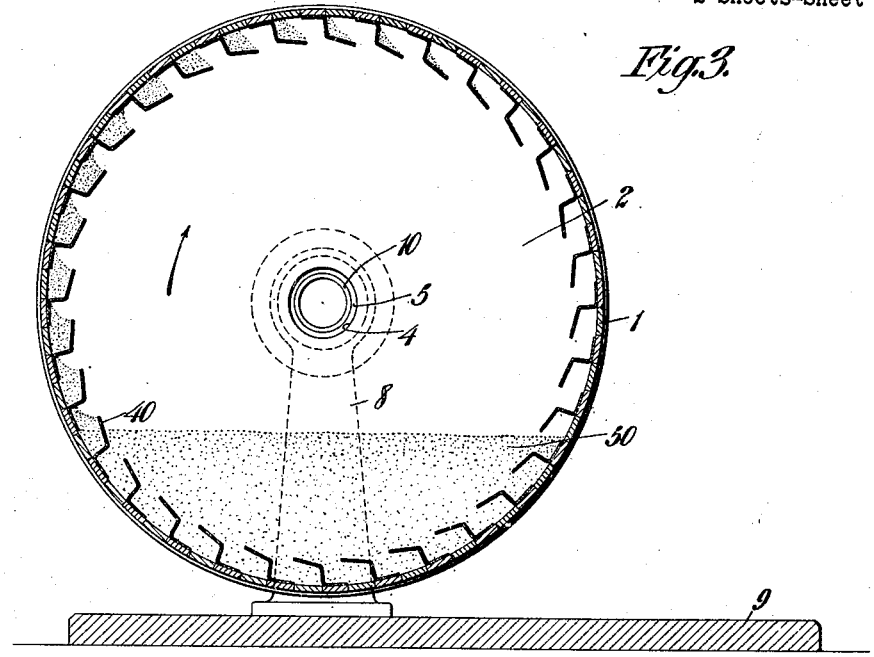
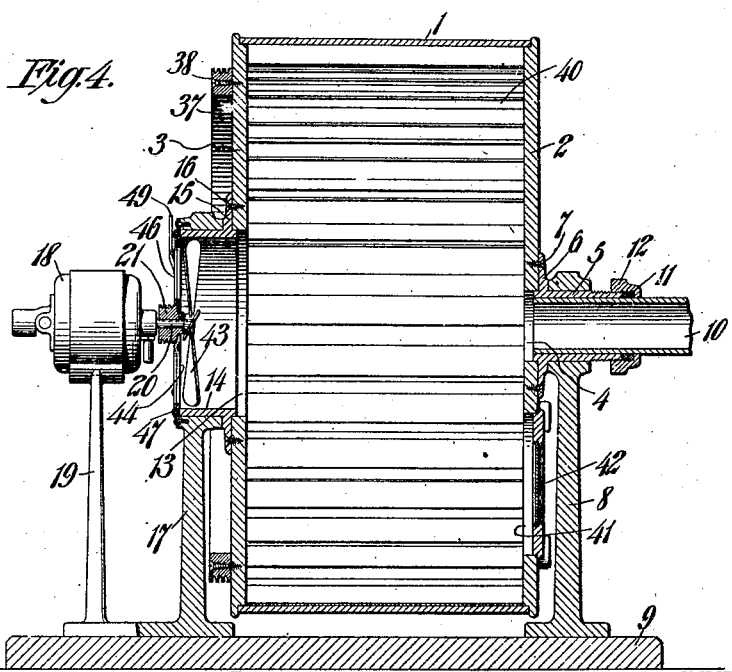
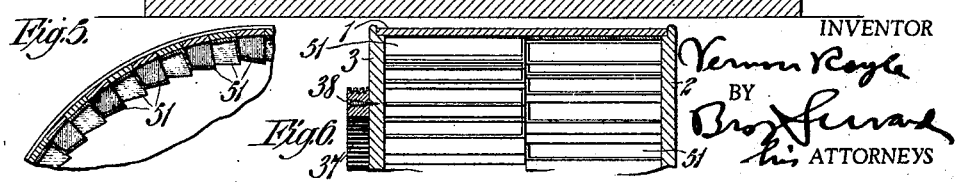
INVENTOR
Vernon Royle
BY
his ATTORNEYS Patented Oct. 2, 1928.

1,686,256

UNITED STATES PATENT OFFICE.

VERNON ROYLE, OF PATERSON, NEW JERSEY.

APPARATUS FOR DISTRIBUTING POWDERED MATERIAL.

Application filed May 26, 1923. Serial No. 641,736.

This invention relates to an apparatus for distributing powdered material, such for instance as soapstone, talc or the like, which is commonly employed in tubing or extruding machines for coating the extruded product in order to prevent adhesion of its different parts.

An object of the invention consists in providing means whereby the powder may be carried along with a comparatively slow moving current of air or the like.

Another object consists in providing means for generating a current of air or the like and passing the powdered material into the said current to be carried away.

Another object consists in providing means for continuously returning to the current of air or the like such of the powdered material as has been passed thereinto and has not been carried along thereby.

Another object consists in providing means for regulating the force of the current of air or the like.

A further object consists in providing certain improvements in the form, construction and arrangement of the several parts, whereby the above named and other objects may be effectively attained.

A practical embodiment of the invention is represented in the accompanying drawings, in which Fig. 1 represents a side elevation of the apparatus.

Fig. 3 represents a section taken in the plane of the line III of Fig. 1, looking in the direction of the arrows.

Fig. 4 represents a section taken in the plane of the line IV—IV of Fig. 2, looking in the direction of the arrows.

Figs. 5 and 6 represent fragmentary transverse and logitudinal sections of a modified form of the invention.

Figure 1:
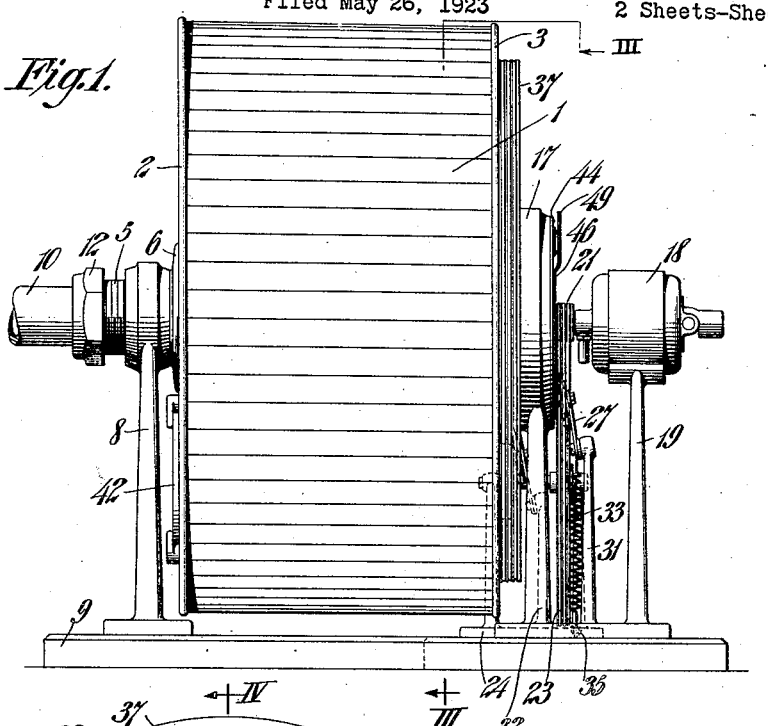
Figure 2:
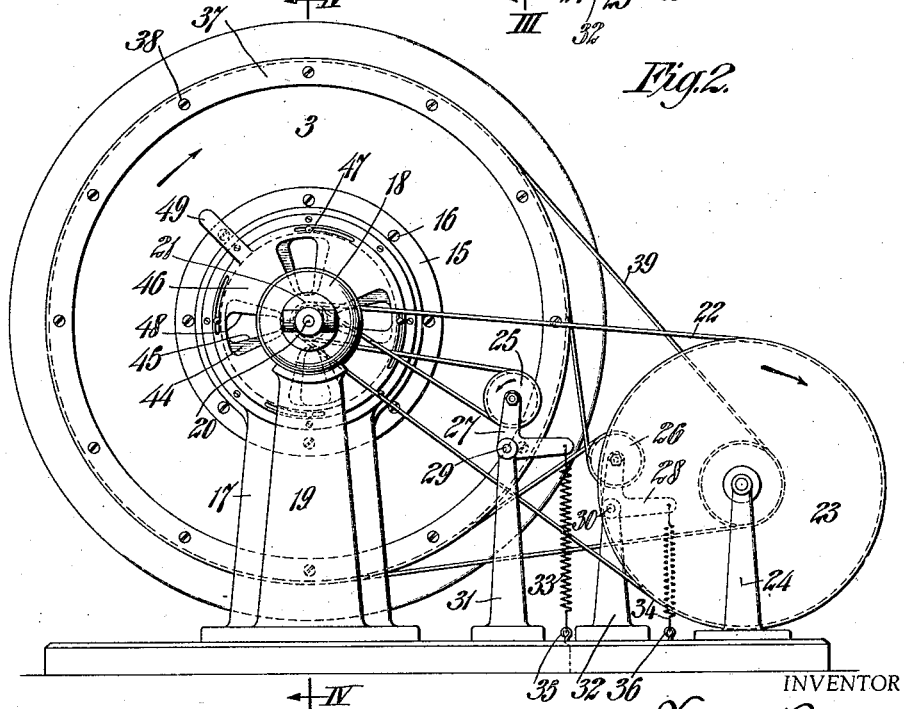
Fig. 2 represents an end elevation thereof.

In supplying non-adhesive powdered material to tubing machines, it has been customary to partially fill a suitable receptacle with the said material and then inject a current of compressed air into the said receptacle, which current would stir up a cloud of the powdered material and force it out through a pipe or other suitable outlet leading from the receptacle. This procedure requires an air current of very considerable force, and this force frequently causes injury to the product of the tubing machine, particularly when the said product consists of a tube of relatively small diameter which is being produced in considerable length. This injury generally arises from the fact that the surface friction of the air within the tubing generates a back pressure after a considerable length of tubing has been extruded, which back pressure causes the air to expand, and thereby distort, a portion of the tubing. My invention overcomes this difficulty by providing means whereby the powdered material can be carried along in a comparatively slow moving and weak current of air or the like.

Referring to the drawings, the apparatus includes a cylinder 1 which may be composed of a plurality of boards, set edge to edge like staves of a barrel, and secured in position by side discs 2, 3.

The side disc 2 has an opening 4 located at its axis, and in this opening is fitted a sleeve 5 that has a flange 6 which is secured to the face of the disc 2 by screws 7. The sleeve 5 has a bearing fit in a standard 8 which is mounted on a suitable base 9; and is intended to receive the end of a discharge pipe 10 which is sealed in connection with the sleeve by a packing 11 and gland 12, the latter being threaded on the sleeve 5, as clearly shown in Fig. 4.

The side disc 3 of the cylinder has a large centrally disposed opening 13 in which is fitted a collar 14 that has a flange 15 which is fastened to the face of the disc 3 by screws 16. This collar 14 has a bearing fit in a standard 17 that is suitably secured to the base 9.

The arrangement just described provides a rotatable mounting for the cylinder 1, 2, 3 in the standards 8, 17, and the apparatus includes mechanism for rotating the cylinder, which mechanism gets its source of power from an electric motor 18 that is mounted at the top of a standard 19 which is fixed on the base 9.

The motor shaft is marked 20 and has a grooved pulley 21 keyed thereon and adapted to receive several turns of an endless driving cord 22.

A two diameter pulley 23, is mounted in a standard 24 that is fixed on the base 9, and two idler pulleys 25 and 26 are mounted at the top of bell cranks 27, 28 which are pivoted at 29 and 30 in the upper ends of standards 31 and 32 which are also fixed on the base 9. The arms of the bell cranks 27 and 28 which do not carry the pulleys are connected by retractile coil springs 33, 34 with screw eyes 35, 36 fixed in the base 9, so that the said springs will normally urge the idler pulleys 25, 26 away from the axis of the cylinder 1, 2, 3.

A large driving rim 37, which has a plurality of grooves formed in its outer face, is secured to the side disc 3 of the cylinder by screws 38 and is adapted for engagement by another endless driving cord 39.

The driving cord 22 extends from pulley 21 on motor shaft 20, around the large diameter of pulley 23, back around pulley 21, and finally down around pulley 25, and back to pulley 21. Driving cord 39 extends from rim 37, around the small diameter of pulley 23, back around driving rim 37, and finally down around pulley 26 and back to rim 37. The pulleys 25 and 26 serve to keep the driving cords 22 and 39 sufficiently taut for effective operation.

The interior of the cylinder 1, 2, 3 is provided with a series of scoops 40, which may be composed of bent metal, and are secured to the inner faces of the boards constituting the body of the cylinder, so as to lie substantially parallel to the axis of the cylinder and extend from the side disc 2 to the side disc 3. These scoops are so bent that they will be filled by any material resting at the bottom of the cylinder and will carry the same along during the rotation of the cylinder until the scoops in question have risen some distance in their travel, at which time, and continuously thereafter until the said scoops have passed the uppermost point in their cycle, the material will be dropped from the said scoops and fall toward the bottom of the cylinder.

In order to supply the material, which may be considered as powdered soapstone, talc or the like, an opening 41 is formed in the side disc 2 of the cylinder and provided with a door 42 which may be opened to permit the material to be shoveled into the cylinder, and then closed to prevent the escape of the material therefrom.

On the shaft 20 of the motor 18 there is mounted a fan 43 which is shown in the present instance as having four blades, and as being housed within the collar 14.

A plate 44 is screwed to the outer face of the collar 14 and has four fan-like apertures 45 formed therein. A shutter 46 is fixed on the plate 44 by pin and slot fastenings 47, so as to have a slight arcuate movement upon the plate 44. This shutter also has several (in the present instance, four) fan-like openings 48 which are substantially the same size and shape as the openings 45 in the plate 44, and the arrangement is such that the shutter may be turned so as to bring its openings 48 partially or wholly into register with the openings 45 in the plate 44. A handle 49 is fixed to the shutter 46 in order to manually accomplish this adjustment.

From the foregoing, it will be seen that the shutter may be manipulated so as to permit more or less air to enter the cylinder behind the fan 43.

In operation, the cylinder 1, 2, 3 is supplied with the desired amount of powdered material through the door 42, as indicated at 50 in Fig. 3. The cylinder and fan are then given rotary movement by starting the motor 18, and the shutter 46 is opened so as to permit a certain amount of air to enter behind the fan 43. The scoops 40 will continuously pick up material from the bottom of the cylinder and, as they move upwardly in their travel, begin to spill the material, which falls down into a current of air generated by the fan 43 and passing axially across the cylinder and out the discharge pipe 10. This air current will pick up and convey with it a certain amount of the powdered material falling into its course, and the same may be delivered from the pipe 10 to a suitable point of ingress at the tubing machine or the like. The strength of the air current, and hence the amount of material carried along thereby, may be regulated by opening the shutter 46 to a greater or less extent, as well as by varying the speed of rotation of the fan; and it will be understood that a relatively weak and slow moving air current may be used because of the fact that the powdered material is dropped directly into the said current, thereby obviating the necessity of a force of air sufficient to stir up a cloud of powdered material from a mass in a receptacle. The cloud of material is mechanically stirred up or formed and passed into the air current, so that it is only necessary for the latter to convey the material along its course.

Referring to the modified form shown in Figs. 5 and 6, it will be observed that the scoops, which are here marked 51, only extend about half way from side to side of the cylinder 1, 2, 3. They have closed ends, and are arranged in staggered relationship. These comparatively short scoops are very simple to manufacture, and there is a certain advantage in their staggered relationship arising from the fact that it provides a very steady supply of material falling down into the air current because the adjacent scoops on opposite sides can be made to overlap or immediately follow each other, when considered in a circumferential direction, thus practically eliminating any intermittency in the feed of material from the scoops to the air current.

I desire it to be understood that various changes may be resorted to in the form, construction and arrangement of the several parts without departing from the spirit and scope of my invention; and hence, I do not intend to be limited to the details herein shown and described, except as they may be included in the claims.

What I claim is:

1. An apparatus of the character described comprising a rotary cylindrical receptacle for the powdered material, means for generating a fluid current in and through said receptacle, a fluid inlet to and a fluid outlet from the receptacle, and means on the receptacle for carrying the material, said carrying means traversing an endless path surrounding the course of the fluid current, whereby the material is taken from a position below the said current carried around and above the same and dropped thereinto.

2. An apparatus of the character described comprising, a rotary cylindrical receptacle for the powdered material, means for generating a fluid current in and through said receptacle, a fluid inlet to and a fluid outlet from the receptacle, means on the receptacle for carrying the material said carrying means traversing an endless path surrounding the course of the fluid current, whereby the material is taken from a position below the said current carried around and above the same and dropped thereinto, and means coacting with the fluid inlet for admitting more or less of the fluid to the receptacle to vary the strength of the current therein.

3. An apparatus of the character described comprising, a rotary receptacle for the material, scoops in and movable with the receptacle for picking up and spilling the material as the receptacle rotates, an outlet from the receptacle, and means for generating a fluid current in the receptacle and causing the current to pass out the outlet.

4. An apparatus of the character described comprising, a rotary cylindrical receptacle for the material, means in and movable with the receptacle for picking up and spilling the material as the receptacle rotates, an outlet from the receptacle, and means for generating a fluid current in the receptacle and causing the current to pass out the outlet.

5. An apparatus of the character described comprising, a rotary cylindrical receptacle for the material, axially disposed means in and movable with the receptacle for picking up and spilling the material as the receptacle rotates, an outlet from the receptacle, and means for generating a fluid current in the receptacle and causing the current to pass out the outlet.

6. An apparatus of the character described comprising, a rotary cylindrical receptacle for the material, axially disposed scoops extending from side to side in and movable with the receptacle for picking up and spilling the material as the receptacle rotates, an outlet from the receptacle, and means for generating a fluid current in the receptacle.

7. An apparatus of the character described comprising, a rotary cylindrical receptacle for the material, means extending from side to side in and movable with the receptacle for picking up and spilling the material as the receptacle rotates, an outlet from the receptacle, and means for generating an axially moving fluid current in the receptacle.

8. An apparatus of the character described comprising, a rotary cylindrical receptacle for the material, axially disposed means extending from side to side in and movable with the receptacle for picking up and spilling the material as the receptacle rotates, an outlet from the receptacle, and means for generating and axially moving fluid current in the receptacle.

9. An apparatus of the character described comprising, a rotary cylindrical receptacle for the material, axially disposed scoops extending from side to side in and movable with the receptacle for picking up and spilling the material as the receptacle rotates, an outlet from the receptacle, and means for generating an axially moving fluid current in the receptacle.

10. An apparatus of the character described comprising, a cylindrical receptacle for the material, an axially disposed outlet at one side and leading outwardly from the receptacle, and an axially disposed fan in the receptacle at the other side thereof for generating a fluid current moving axially through the receptacle toward the outlet.

11. An apparatus of the character described comprising, a rotary cylindrical receptacle for the material, an axially disposed outlet at one side and leading outwardly from the receptacle, and an axially disposed fan in the receptacle at the other side thereof for generating a fluid current moving axially through the receptacle toward the outlet.

12. An apparatus of the character described comprising, a cylindrical receptacle for the material, an axially disposed outlet from the receptacle, an axially disposed fan in the receptacle for generating a fluid current moving axially toward the outlet, and a shutter for admitting more or less of the fluid to the fan.

13. An apparatus of the character described comprising, a rotary cylindrical receptacle for the material, an axially disposed outlet from the receptacle, an axially disposed fan in the receptacle for generating a fluid current moving axially toward the outlet, and a shutter for admitting more or less of the fluid to the fan.

14. An apparatus of the character described comprising, a rotary receptacle for the material, scoops arranged to extend partway across and at opposite sides of the receptacle in staggered relationship for uninterruptedly picking up and spilling the material as the receptacle rotates, an outlet from the receptacle, and means for generating a fluid current in the receptacle.

In testimony that I claim the foregoing as my invention, I have signed my name this tenth day of May, 1923.

VERNON ROYLE.